United States Patent
Liu et al.

(10) Patent No.: US 10,484,197 B2
(45) Date of Patent: Nov. 19, 2019

(54) INTERNET OF THINGS (IOT) COMMUNICATION METHOD, COMMUNICATION END, AND USER END

(71) Applicant: Tencent Technology (Shenzhen) Co., Ltd., Shenzhen, Guangdong (CN)

(72) Inventors: Lejun Liu, Guangdong (CN); Liangliang Fan, Guangdong (CN); Kai Liu, Guangdong (CN); Xiangyao Lin, Guangdong (CN); Chenglin Liu, Guangdong (CN); Can Liu, Guangdong (CN)

(73) Assignee: TENCENT TECHNOLOGY (SHENZHEN) COMPANY LIMITED, Shenzhen, Guangdong (CA)

( * ) Notice: Subject to any disclaimer, the term of this patent is extended or adjusted under 35 U.S.C. 154(b) by 210 days.

(21) Appl. No.: 15/165,934

(22) Filed: May 26, 2016

(65) Prior Publication Data
US 2016/0277205 A1 Sep. 22, 2016

Related U.S. Application Data

(63) Continuation of application No. PCT/CN2014/093399, filed on Dec. 9, 2014.

(30) Foreign Application Priority Data

Dec. 9, 2013 (CN) .......................... 2013 1 0665083

(51) Int. Cl.
*H04L 12/28* (2006.01)
*H04W 4/70* (2018.01)
(Continued)

(52) U.S. Cl.
CPC ........ *H04L 12/2816* (2013.01); *G06K 7/1417* (2013.01); *H04L 51/04* (2013.01);
(Continued)

(58) Field of Classification Search
CPC ...... H04L 12/2816; H04L 51/04; H04W 4/70; H04W 76/10; H04W 4/005; H04W 12/04; H04W 76/02; G06K 7/1417
(Continued)

(56) References Cited

U.S. PATENT DOCUMENTS 7,310,344 B1 * 12/2007 Sue ..................... H04L 12/2803
370/410
2002/0049806 A1 * 4/2002 Gatz ....................... G06F 21/62
709/203
(Continued)

FOREIGN PATENT DOCUMENTS

CN 1852195 A 10/2006
CN 101655716 A 2/2010
(Continued)

OTHER PUBLICATIONS

Kaed, Home Devices Mediation Using Ontology Alignment and Code Generation Techniques, Mar. 17, 2012, https://tel.archives-ouvertes.fr/tel-00680022/document (Year: 2012).*
(Continued)

*Primary Examiner* — James E Springer
(74) *Attorney, Agent, or Firm* — Brinks, Gilson & Lione

(57) ABSTRACT

An IoT communication method, including: receiving via an account of the communication end, access information or control information sent from an account of a user end. The access information includes an identifier of a source terminal and an access command which accesses status information of the source terminal. The control information includes the identifier of the source terminal and a control command which controls the source terminal, the account of the communication end and the account of the user end are bound to each other in instant messaging software; sending the access command or the control command to the source terminal specified by the identifier of the source terminal;
(Continued)

obtaining source information which the source terminal returns in response to receiving the access command or the control command from the communication end; sending, via the account of the communication end, the source information to the account of the user end.

22 Claims, 3 Drawing Sheets

(51) Int. Cl.
*H04W 76/10* (2018.01)
*H04L 12/58* (2006.01)
*G06K 7/14* (2006.01)
*H04W 12/00* (2009.01)

(52) U.S. Cl.
CPC ............ *H04W 4/70* (2018.02); *H04W 12/003* (2019.01); *H04W 76/10* (2018.02); *H04W 12/00522* (2019.01)

(58) Field of Classification Search
USPC .......................................................... 709/206
See application file for complete search history.

(56) References Cited

U.S. PATENT DOCUMENTS

| | | | | |
|---|---|---|---|---|
| 2002/0103850 A1* | 8/2002 | Moyer | .............. | H04L 29/06027 709/202 |
| 2002/0107933 A1* | 8/2002 | Choi | .................. | H04L 12/2803 709/208 |
| 2003/0078979 A1* | 4/2003 | Sagi | ........................ | H04L 29/06 709/206 |
| 2003/0233424 A1* | 12/2003 | Seo | ........................ | G08C 17/02 709/217 |
| 2004/0103153 A1* | 5/2004 | Chang | ................ | H04L 12/2803 709/206 |
| 2004/0158630 A1* | 8/2004 | Chang | .................... | H04L 41/24 709/224 |
| 2004/0172396 A1* | 9/2004 | Vanska | .............. | G07C 9/00309 |
| 2006/0133392 A1* | 6/2006 | Ajitomi | .............. | H04L 12/2803 370/401 |
| 2006/0142880 A1* | 6/2006 | Deen | ....................... | G05B 15/02 700/19 |
| 2006/0186986 A1* | 8/2006 | Ma | ....................... | G05B 19/042 340/3.9 |
| 2007/0294359 A1* | 12/2007 | Kao | ........................ | H04L 51/04 709/207 |
| 2009/0259742 A1* | 10/2009 | Wong | .................... | H04L 12/281 709/223 |
| 2009/0327436 A1* | 12/2009 | Chen | ....................... | H04L 51/04 709/206 |
| 2010/0071053 A1* | 3/2010 | Ansari | .................. | G06Q 30/04 726/12 |
| 2010/0174791 A1* | 7/2010 | Tian | ........................ | H04L 51/04 709/206 |
| 2010/0299392 A1* | 11/2010 | Chiou | ................. | H04L 12/5805 709/206 |
| 2012/0096085 A1* | 4/2012 | Yoon | .................... | H04L 12/2818 709/204 |
| 2013/0003878 A1* | 1/2013 | Hurwitz | ................ | H04W 36/14 375/257 |
| 2014/0304381 A1* | 10/2014 | Savolainen | ......... | H04L 41/0806 709/222 |
| 2015/0074259 A1* | 3/2015 | Ansari | .................... | H04L 67/02 709/224 |
| 2015/0134116 A1* | 5/2015 | Li | .......................... | H04L 51/32 700/275 |

FOREIGN PATENT DOCUMENTS

| | | |
|---|---|---|
| CN | 101656692 A | 2/2010 |
| CN | 201749342 U | 2/2011 |
| CN | 102495618 A | 6/2012 |
| CN | 103312800 A | 9/2013 |
| CN | 104144109 A | 11/2014 |
| CN | 104144200 A | 11/2014 |

OTHER PUBLICATIONS

1$^{st}$ Office Action received in Chinese Application No. 201310665083.1 dated Sep. 2, 2015.
2$^{nd}$ Office Action received in Chinese Application No. 201310665083.1 dated Nov. 4, 2015.
3$^{rd}$ Office Action received in Chinese Application No. 201310665083.1 dated Feb. 2, 2016.
International Search Report and Written Opinion received in PCT Application No. PCT/CN2014/093399 dated Mar. 15, 2015.

* cited by examiner

INTERNET OF THINGS (IOT) COMMUNICATION METHOD, COMMUNICATION END, AND USER END

CROSS-REFERENCE TO RELATED APPLICATIONS

The application is a continuation of PCT Application No. PCT/CN2014/1093399, filed on Dec. 9, 2014, which claims priority to Chinese Patent Application No. 2013106650831, filed on Dec. 9, 2013, which is incorporated by reference in their entireties.

FIELD OF THE TECHNOLOGY

The present disclosure relates to an Internet of Things (IoT) communication method, communication end, and user end in the field of IoT technology.

BACKGROUND

An ordinary smart electric appliance may be connected to a cloud server via a router, and a user end may control and obtains information on the smart electric appliance by via connecting to the cloud server. The smart electric appliance generally is required to include a logic module which matches to the applications of its user end control, thus incurring additional costs in IoT communication.

SUMMARY

The following embodiments provide an IoT communication method, communication end, and user end as solutions to reduce the costs of IoT communication.

An embodiment of the disclosure discloses an IoT communication method, which includes at least the following operations: receiving by a communication end via an account of the communication end, access information or control information sent from an account of a user end, wherein: the access information includes an identifier of a source terminal and an access command which is enabled to access status information of the source terminal, the control information includes the identifier of the source terminal and a control command which is enabled to control the source terminal, and the account of the communication end and the account of the user end are bound to each other in instant messaging software; sending the access command or the control command to the source terminal which is specified by the identifier of the source terminal; obtaining by the communication end, source information from the source terminal which the source terminal returns in response to receiving the access command or the control command from the communication end; and sending, via the account of the communication end, the source information to the account of the user end.

Another embodiment discloses an IoT communication method, which include: sending by a user end, access information or control information via an account of the user end to an account of a communication end, wherein; the access information includes a identifier of the source terminal and an access command which is enabled to access the status information of the source terminal, the control information includes the identifier of the source terminal and a control command which is enabled to control the source terminal, and the account of the user end and the account of the communication end are bound to each other in instant messaging software; receiving and displaying via the account of the user end, source information from by the communication end, wherein the source information is returned to the communication end in response to the source terminal teeming the access command or the control command from the communication end.

Another embodiment discloses an Internet of Things (IoT) communication end, which includes at least a processor with circuitry operating in conjunction with at least a memory which stores instruction codes operable as plurality of modules, wherein the plurality of modules include: a receiving module, which is enabled to receive via an account of the communication end, access information or control information sent from an account of a user end, wherein: the access information includes an identifier of a source terminal and an access command which is enabled to access status information of the source terminal, the control information includes the identifier of the source terminal and a control command which is enabled to control the source terminal, and the account of the communication end and the account of the user end are bound to each other in instant messaging software; a sending module, which is enabled to send the access command or the control command to the source terminal which is specified by the identifier of the source terminal; an acquisition module, which is enabled to obtain source information from the source terminal which the source terminal returns in response to receiving the access command or the control command from the communication end; and a forwarding module, which is enabled to send via the account of the communication end, the source information to the account of the user end.

Another embodiment discloses an IoT user end, which include: at least a processor with circuitry operating in conjunction with at least a memory which stores instruction codes operable as plurality of modules, wherein the plurality of modules include: a command sending module, which is enabled to send access information or control information via an account of the user end to an account of a communication end, wherein: the access information includes a identifier of the source terminal and an access command which is enabled to access the status information of the source terminal, the control information includes the identifier of the source terminal and a control command which is enabled to control the source terminal, and the account of the user end and the account of the communication end are bound to each other in instant messaging software; and a receiving and displaying module, which is enabled to receive and display, via the account of the user end, source information from by the communication end, wherein the source information is returned to the communication end in response to the source terminal receiving the access command or the control command from the communication end.

The IoT communication method, communication end and user end may be improved through the use of a communication end router, such that a source terminal may communicate with an account of the user end via an account of the communication end without any intervention of additional equipment, thereby reducing communication expenses.

BRIEF DESCRIPTION OF THE DRAWINGS

The accompanying drawings may be included to provide further understanding of the claims and disclosure which may be incorporated in, and constitute a part of this specification. The detailed description and illustrated embodiments described may serve to explain the principles defined by the claims.

DETAILED DESCRIPTION OF THE EMBODIMENTS

The various embodiments of the present disclosure may be further described in details in combination with attached drawings and embodiments below. It should be understood that the specific embodiments described here may be used only to explain the present disclosure, and may be not which is used to limit the present disclosure. In addition, for the sake of keeping description brief and concise, the newly added features, or features that may be different from those previously described in each new embodiment will be described in details. Similar features may be referenced back to the prior descriptions in a prior numbered drawing or referenced ahead to a higher numbered drawing.

Unless otherwise specified, all technical and scientific terms herein may have the same meanings as understood by a person skilled in the art. The terms herein used in the specification for the IoT communication method, communication end, and user end are for illustration only, but are not intended to restrict the present disclosure. Any use of "And/or" herein may mean anyone of or any combinations selected from the multiple items listed.

An embodiment of the IoT communication method may be implemented by as user end (for example, a mobile phone or a tablet PC) which may be connected to the Internet via a communication end, such as an access point (AP). Via the communication end (i.e., Access Point (AP)), the user end may communicate with a source terminal (for example, a smart electric appliance) which is enabled to perform wireless communication, in order that the user end may be enabled to remotely control a source terminal (for example, an air conditioner and a water heater), or to read the status information of the source terminal via the user end.

Figure 1:
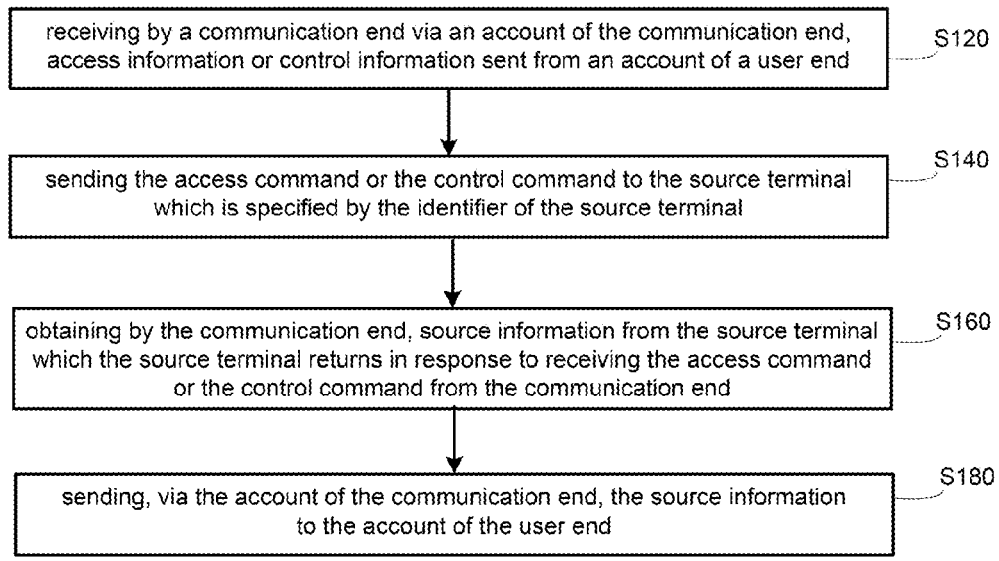
FIG. 1 shows a flowchart of an exemplary IoT communication method, according to an embodiment of disclosure.

FIG. 1 shows a flowchart of an exemplary IoT communication method, according to an embodiment of disclosure. This embodiment may be applied to a source terminal (for example, a smart electric appliance) which is enabled to perform wireless communication. More specifically, the source terminal may be connected to the Internet and is controlled by a user end (e.g., a smart phone, a tablet PC or a laptop computer) via instant messaging software. The method includes at least the following exemplary operations:

S120: receiving by a communication end via an account of the communication end, access information or control information sent from an account of a user end, wherein: the access information includes an identifier of a source terminal and an access command which is enabled to access status information of the source terminal, the control information includes the identifier of the source terminal and a control command which is enabled to control the source terminal, and the account of the communication end and the account of the user end are bound to each other in instant messaging software.

Since both the account of the communication end and the account of the user end are instant messaging accounts, therefore data may be transmit instantly, thereby ensuring the instantaneousness of communication. The account of the communication end may be predetermined in a communication end, which may be a wireless AP or a wireless router. By improving the communication end (i.e., wireless AP), the source terminal (i.e., a smart electric appliance) may access the wireless AP via a wireless network without any intervention of additional equipment, and may communicate with the account of the user end via the account of the communication end (wireless AP), thereby reducing communication costs.

The account of the user end may be predetermined in a mobile phone, tablet PC, or another terminal. The communication end receives via the Internet the access information or control information sent by the user end. In an embodiment, the account of the communication end may be an instant messaging account of the wireless AP, the account of the user end may be an instant messaging account of the user. A binding relationship between the account of the communication end and the account of the user end may be equal to a convenient friendship during an instant messaging session. The user's mobile phone may be fitted with instant messaging (IM) software which may be utilized to log into the account of the user end, so the user may be transfer in formation with the account of the communication end in the wireless AP via the account of the user end in the mobile phone to control the source terminal connected to the wireless network of the wireless AP.

S140: Sending the access command or the control command to the source terminal which is specified by the identifier of the source terminal, wherein the source terminal is a smart electric appliance which is enabled to perform receiving and executing an access command or control command. Preferably, the source terminal is an electric appliance enabled to perform wireless communication, and may communicate with a communication end by means of WiFi. Furthermore, a lot of smart electric appliances may support the IGRS (Intelligent Grouping and Resource Sharing) protocol. Therefore, the source terminal may communicate with the communication end through the IGRS protocol.

The source terminal may also be a smart home appliance as a TV set, a washer, a refrigerator, an air conditioner, a water heater, a water dispenser, an electric rice cooker, or a computer. The access command which may be utilized to access the status information of the source terminal may be read as the temperature of an air conditioner, temperature of a water heater, and refrigerating status of a water dispenser. The control command which is enabled to control the source terminal may set the temperature of an air conditioner, set the temperature of a water heater, and enable the refrigeration function of a water dispenser, respectively. A single communication end may be connected to a plurality of source terminals, which are distinguishable by different identifiers of the source terminals. For example, a wireless AP may be connected to a refrigerator (identifier A), an air conditioner (identifier B), and a water heater (identifier C).

S160: Obtaining by the communication end, the source information sent by the communication end, which the source information is returned by the source terminal in response to the source terminal receiving the access command or control command. Upon receiving the access command or control command sent by a communication end, the source terminal may need to execute different operations according to the access command or control command, generate source information according to the execution results, and return the source information to the communication end. The source information may be status information such as the temperature of an air conditioner, the temperature of a water heater, and refrigerating status of a water dispenser. The source information may also be information as to whether the temperature of an air conditioner is set successfully, whether the temperature of a water heater is set successfully, and whether the refrigeration function of a water dispenser is enabled successfully.

S180: Sending via the account of the communication end, the source information to the account of the user end. Upon obtaining the source information, the communication end may forward the source information to the user end. Then, the user end may receive the information on the source terminal remotely and send a further command to control the source terminal remotely. In an embodiment, the user end may have a plurality of accounts bound to as single account of the communication end, and a single communication end may receive and respond to commands sent by multiple user ends. For example, multiple members with the same family may want to control various smart home appliances in the home via different accounts of the user end using their respective mobile phones and computers.

In an embodiment, the IoT communication method may further include: monitoring fault information sent by the source terminal, and sending the fault information to the account of the user end according to the account of the communication end. Safety is vital for a smart home appliance which runs in an unattended environment. In case of a fault, the source terminal may generate fault information, and the communication end may monitor the fault information in real time. Upon receiving fault information, the communication end sends the fault information to a user end instantly, thereby minimizing the possible dangers and losses arising from the fault. The fault information may be information such as water leakage of an air conditioner, electric leakage of a water heater, and water shortage of a water dispenser.

Figure 2:
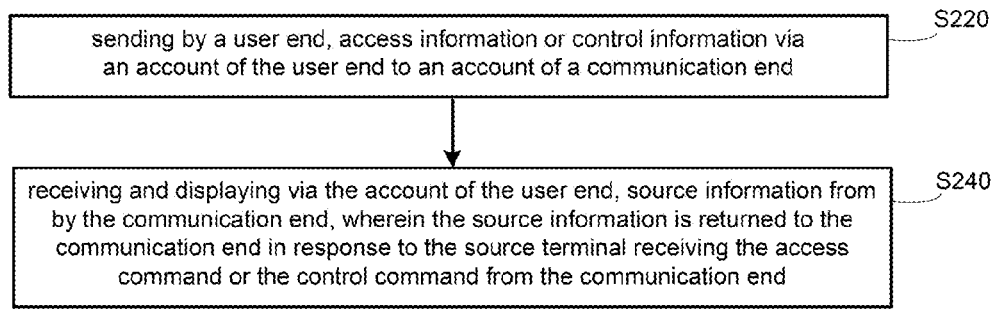
FIG. 2 shows a flowchart of an exemplary IoT communication method, according to another embodiment of disclosure.

FIG. 2 shows a flowchart of an exemplary IoT communication method, according to another embodiment of disclosure. This embodiment may be applied to a user end terminal (for example, a mobile phone or a tablet PC) which may be connected to the Internet via a communication end to control a source terminal. The source terminal may be a smart appliance and the communication end may be a wireless AR.

The method may include the following operations:

S220: Sending by a user end, access information or control information via an account of the user end to an account of a communication end wherein: the access information includes a identifier of the source terminal and an access command which is enabled to access the status information of the source terminal, the control information includes the identifier of the source terminal and a control command which is enabled to control the source terminal, and the account of the user end and the account of the communication end are bound to each other in instant messaging software.

S240: Receiving and displaying via the account of the user end, source information from by the communication end, wherein the source information is returned to the communication end in response to the source terminal receiving the access command or the control command from the communication end.

Upon receiving an access command or control command sent by a communication end, a source terminal may need to execute different operations according to the access command or control command, generate source information according to the execution results, and return the source information to the communication end. The source terminal may also be a smart home appliance as a TV set, a washer, a refrigerator, an air conditioner, a water heater, a water dispenser, an electric rice cooker, or a computer. The access command which may be utilized to access the status information of the source terminal may be read as the temperature of an air conditioner, temperature of a water heater, and refrigerating status of a water dispenser. The control command which is enabled to control the source terminal may set the temperature of an air conditioner, set the temperature of a water heater, and enable the refrigeration function of a water dispenser, respectively. A single communication end may be connected to a plurality of source terminals, which are distinguishable by different identifiers of the source terminals. For example, a wireless AP may be connected to a refrigerator (identifier A), an air conditioner (identifier B), and a water heater (identifier C).

In an embodiment, there may be a plurality of accounts of the user end bound to one account of the communication end, and one communication end may be receive and respond to commands sent by multiple user ends. For example, multiple members of one family may be control the smart home appliances in the home via different accounts of the user end by using their respective mobile phones and computers. Furthermore, the first account of the user end may be bound to an account of a communication end as the master account and other accounts of the user end being slave accounts. Slave accounts may not be bound to an account of as user end unless authorized by the master account.

In one embodiment, there may be a plurality of account of the communication ends bound to one account of the user end. The embodiment also include: displaying by categories, received plurality of source information according to the account of the communication end. The same user may have one residence in Shenzben and one residence in Guangzhou. The smart electric appliances in the two residences communicate with the user via different communication ends, and different communication ends have different accounts of the user end. Therefore, the smart electric appliances in the two residences may be distinguished by accounts of the user end, and may be further be displayed by categories.

In one embodiment, an account of a user end may establish a communication link with an account of another communication end or a source terminal utilizing one of or a combination of the following: 2-dimensional (2D) barcode scanning, text or numerical information input, Bluetooth, Near Field Communication (NFC), and WiFi. In an embodiment, packaging container of the communication end or the communication end is installed with 2-dimensional (2-D) barcode, wherein the 2-D barcode includes an encrypted account of the communication end, and the account of the communication end is obtained by scanning and decrypting the 2-D barcode.

In another embodiment, a cloud server of the instant messaging software may pre-store a device type, device account, and key of a communication end; an account of a user end may obtain the device account and device type information of the communication end by scanning the 2-dimensional barcode (for example, a 2-dimensional barcode pasted on a wireless router) of the communication end, and then sends such information to the cloud server the cloud server may push the key of the communication end to the account of the user end, thereby binding the account of the communication end to the account of the user end.

Correspondingly, a 2-dimensional barcode may be available on the source terminal or on the source terminal packaging, container, and the 2-dimensional barcode may include an encrypted device identifier and device type of the source terminal. The cloud server of the instant messaging software may pre-store the device type, device identifier, and key of the source terminal. The account of the user end may obtain a device identifier and device type information of the source terminal by scanning the 2-dimensional barcode of the source terminal, and may then send such information to the cloud server. The account of the communication end may have already bound to the account of the user end, such that the cloud server may push the key of the source terminal to the account of the communication end, thereby binding the account of the communication end to the source terminal. Scanning the 2-dimensional barcode of the source terminal may be more convenient, because the user may not need to input any information. The user may simply scan the account of the communication end or the 2-dimensional barcode printed on the source terminal utilizing a camera on a mobile phone or tablet PC, thus provide cost effectiveness in IoT communication for controlling the source terminal.

Figure 3:
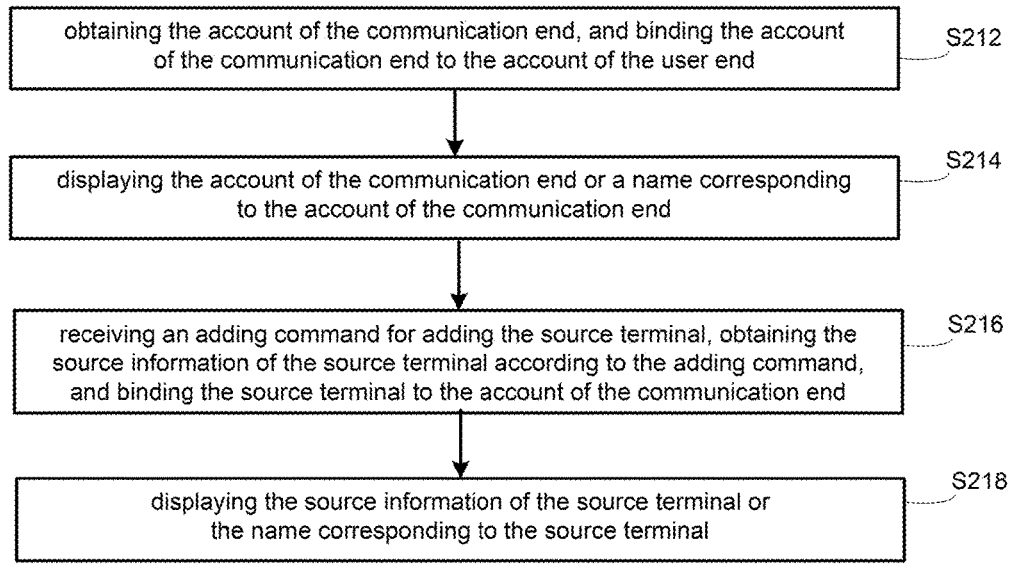
FIG. 3 shows a flowchart of another exemplary IoT communication method, according to another embodiment of disclosure.

Step S220 may further be described through the steps S212-S218 in FIG. 3, wherein prior to the establishment of a communication link and receiving and displaying of the source information via the account of the user end, the method may include:

S212: obtaining the account of the communication end, and binding the account of the communication end to the account of the user end. In one embodiment, Step S212 may be preceded with the user end has enabled the instant messaging software on his/her mobile phone (i.e., user end) and select "Build my home" on an interface. The user end may then generate a "My home" interface according to the user's command, and generate a 2-dimensional barcode scanning interface. An account of a communication end may be obtained by scanning the 2-dimensional barcode of a communication end.

S214: displaying the account of the communication end or a name corresponding to the account of the communication end. For example, the name may be the name of a communication end given by the user, for example, "My home" and "Shenzhen residence".

S216: receiving an adding command for adding the source terminal, obtaining the source information of the source terminal according to the adding command, and binding the source terminal to the account of the communication end. For example, the user may select "Add smart electric appliance" in the instant messaging software and then a 2-dimensional barcode scanning interface may be generated on the interface of the user end. By scanning the 2-dimensional barcode of the smart electric appliance, the user may obtain the source terminal information and bind the source terminal to an account of a communication end.

S218: displaying the source information of the source terminal or the name corresponding to the source terminal. After the binding operation is successful, the user end may display the source terminal information or the name corresponding to a source terminal. Then, the user may perform further operations according to the displayed information.

An embodiment of the IoT communication system may be suitable for a user end (for example, a mobile phone or a tablet PC) which may be connected to the Internet. Via a communication end (for example, an Access Point (AP)), the user end may communicate with a source terminal (for example, a smart electric appliance) which is enabled to perform wireless communication, so which the user may remotely control a source terminal (for example, an air conditioner and a water heater) or read the status information of the source terminal via the user end.

More specifically, the command end may include:

A command sending module, which is enabled to send access information or control information via an account of a user end to an account of a communication end, wherein the access information includes a identifier of the source terminal and an access command which is enabled to access the status information of the source terminal, the control information includes a identifier of account of the user end and the account of the communication end are bound to each other in instant messaging software.

A receiving module, which is enabled to receive via an account of a communication end the access information or control information sent from an account of a user end.

A sending module, which is enabled to send an access command or a control command to the source terminal which is specified by a identifier of the source terminal.

An acquisition module, which is enabled to obtain the source information which a source terminal returns in response to the access command or control command.

A forwarding module, which is enabled to send source information via an account of a communication end to an account of a user end.

A receiving and displaying module, which is enabled to receive and display via an account of a user end the source information which an account of a communication end sends as a response of the source terminal to the access command or the control command.

Figure 4:
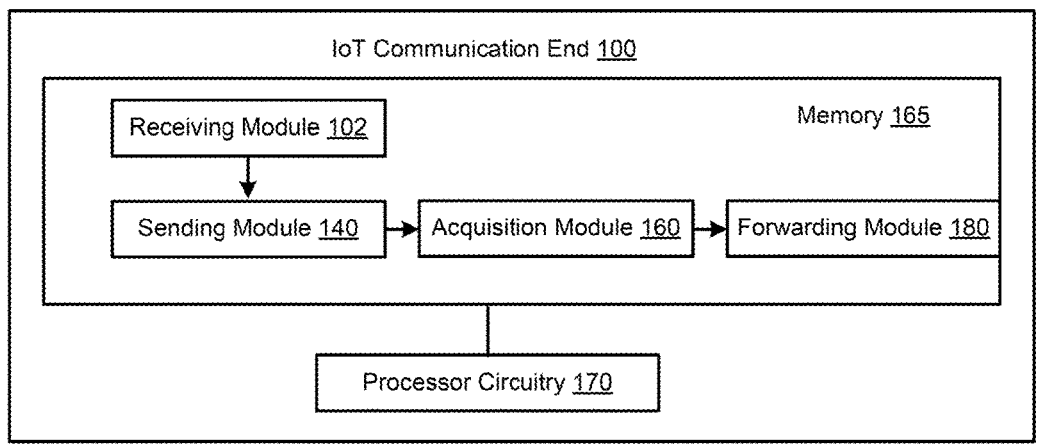
FIG. 4 shows an exemplary schematic diagram of an IoT communication end, according to an embodiment of disclosure.

FIG. 4 shows an exemplary schematic diagram of an IoT communication end (100), according to an embodiment of disclosure. This embodiment may be specifically be applied to a source terminal (for example, a smart electric appliance) enabled to perform wireless communication. The source terminal is connected to the Internet via the IoT communication end provided in this embodiment, communicates with a user end via instant messaging software, and thus is remotely controlled by the user end. As shown in FIG. 4, the IoT communication end (100) may include at least a processor (170) with circuitry operating in conjunction with at least a memory (165) which stores instruction codes operable as plurality of modules, wherein the plurality of modules include: a receiving module (120), a sending module (140), an acquisition module (160) and a forwarding module (180).

The receiving module (102) may be utilized to receive via an account of the communication end, access information or control information sent from an account of a user end, wherein: the access information includes an identifier of a source terminal and an access command which is enabled to access status information of the source terminal, the control information includes the identifier of the source terminal and a control command which is enabled to control the source terminal, and the account of the communication end and the account of the user end are hound to each other in instant messaging software.

Both the account of the communication end and the account of the user end are instant messaging accounts, which may transmit data instantly, thereby ensuring the instantaneousness of communication. The account of the user end may be predetermined in a mobile phone, tablet PC, or another terminal. The communication end receives via the Internet the access information or control information sent by the user end. In an embodiment, the account of the communication end may be an instant messaging account of the wireless AP, the account of the user end may be an instant messaging account of the user. A binding relationship between the account of the communication end and the account of the user end may be equal to a convenient friendship during an instant messaging session. The user's mobile phone may be fitted with instant messaging (IM) software which may be utilized to log into the account of the user end, so the user may be transfer information with the account of the communication end in the wireless AP via the account of the user end in the mobile phone to control the source terminal connected to the wireless network of the wireless AP.

The sending module (140) may be utilized to send the access command or the control command to the source terminal which is specified by the identifier of the source terminal. The source terminal is a smart electric appliance which is enabled to perform receiving and executing an access command or control command. Preferably, the source terminal is an electric appliance enabled to perform wireless communication, and may communicate with a communication end by means of WiFi. Furthermore, a lot of smart electric appliances may support the IGRS (Intelligent Grouping and Resource Sharing) protocol. Therefore, the source terminal may communicate with the communication end through the IGRS protocol.

The source terminal may also be a smart home appliance as a TV set, a washer, a refrigerator, an air conditioner, a water heater, a water dispenser, an electric rice cooker, or a computer. The access command which may be utilized to access the status information of the source terminal may be read as the temperature of an air conditioner, temperature of a water heater, and refrigerating status of a water dispenser. The control command which is enabled to control the source terminal may set the temperature of an air conditioner, set the temperature of a water heater, and enable the refrigeration function of a water dispenser, respectively. A single communication end may be connected to a plurality of source terminals, which are distinguishable by different identifiers of the source terminals. For example, a wireless AP may be connected to a refrigerator (identifier A), an air conditioner (identifier B), and a water heater (identifier C).

The acquisition module (160) may be utilized to obtain source information from the source terminal which the source terminal returns in response to receiving the access command or the control command from the communication end. Upon receiving the access command or control command sent by a communication end, the source terminal may need to execute different operations according to the access command or control command, generate source information according to the execution results, and return the source information to the communication end. The source information may be status information such as the temperature of an air conditioner, the temperature of a water heater, and refrigerating status of a water dispenser. The source information may also be information as to whether the temperature of an air conditioner is set successfully, whether the temperature of a water heater is set successfully, and whether the refrigeration function of a water dispenser is enabled successfully.

The forwarding module (180) may be utilized to send via the account of the communication end, the source informa-tion to the account of the user end. Upon obtaining source information, the communication end forwards the source information to the user end. Then, the user end may be remotely receive the information on the source terminal and send a further command for remote control according to the information on the source terminal. In an embodiment, there may be a plurality of accounts of the user end bound to one account of the communication end, and one communication end may be receive and respond to commands sent by multiple user ends. For example, multiple members of one family may be control the smart home appliances in the home via different accounts of the user end by using their respective mobile phones and computers.

In an embodiment, the IoT communication method may further include: monitoring limit information sent by the source terminal, and sending the fault information to the account of the user end according to the account of the communication end. Safety is vital for a smart home appliance which runs in an unattended environment. In case of a fault, the source terminal may generate fault information, and the communication end may monitor the fault information, in real time. Upon receiving fault information, the communication end sends the fault information to a user end instantly, thereby minimizing the possible dangers and losses arising from the fault. The fault information may be information such as water leakage of an air conditioner, electric leakage of a water heater, and water shortage of a water dispenser.

Figure 5:
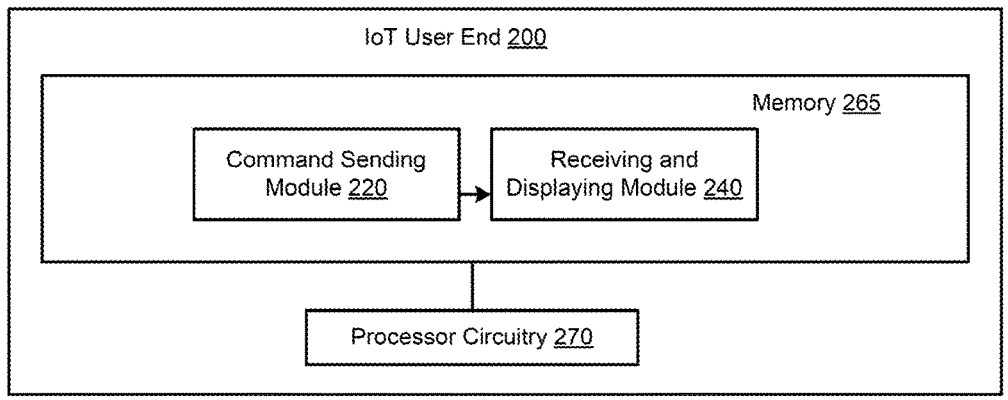
FIG. 5 shows an exemplary schematic diagram of an IoT user end, according to an embodiment of disclosure.

FIG. 5 shows an exemplary schematic diagram of an IoT user end, according to an embodiment of disclosure. This embodiment may be a user end terminal (for example, a mobile phone or a tablet PC) which may be connected to the Internet. Via a communication end enabled to perform accessing the Internet, the terminal is connected to a source terminal enabled to perform wireless communication, and controls the source terminal.

As shown in FIG. 5, the IoT user end (200) may include at least a processor (270) with circuitry operating in conjunction with at least a memory (265) which stores instruction codes operable as plurality of modules, wherein the plurality of modules may include: a command sending module (220) and a receiving and displaying module (240).

The command sending module (220) is enabled to send access information or control information via an account of the user end to an account of a communication end, wherein: the access information includes a identifier of the source terminal and an access command which is enabled to access the status information of the source terminal, the control information includes the identifier of the source terminal and a control command which is enabled to control the source terminal, and the account of the user end and the account of the communication end are bound to each other in instant messaging software.

The receiving and displaying module (240) is enabled to receive and display, via the account of the user end, source information from by the communication end, wherein the source information is returned to the communication end in response to the source terminal receiving the access command or the control command from the communication end.

Figure 6:
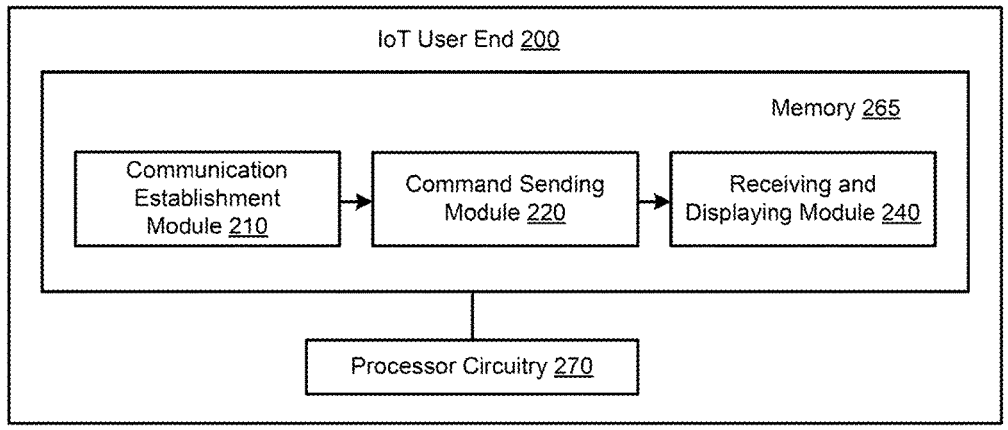
FIG. 6 shows an exemplary schematic diagram of an IoT user end, according to another embodiment of disclosure.

FIG. 6 shows an exemplary schematic diagram of an IoT user end, according to another embodiment of disclosure. The communication user end (200) may further include a communication establishment module (210), which is enabled to execute the operations as shown in FIG. 3. The details of the operations may not be described again.

In addition, the account of the user end may be established with the account of the communication end or with the source terminal via as communication link utilizing one of or a combination of the following: 2-dimensional (2D) barcode scanning, text or numerical information input, Bluetooth, Near Field Communication (NFC), and WiFi.

The sequence numbers of the above-mentioned embodiments may be intended only for description, instead of indicating the relative merits of the embodiments. It should be understood by those with ordinary skill in the art which all or some of the steps of the foregoing embodiments may be implemented by hardware, or software program codes stored on as non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive, ROM or flash memory. The computer-executable commands may be which is which is enabled to enable a computer, server, a smart phone, a tablet or any similar computing device to render Internet of Things (IoT) communication operations among a system which include at least a communication end, a source end and a user end.

The foregoing represents only some preferred embodiments of the present disclosure and their disclosure may not be construed to limit the present disclosure in any way. Those of ordinary skill in the art will recognize which equivalent embodiments may be created via slight alterations and modifications using the technical content disclosed above without departing from the scope of the technical solution of the present disclosure, and such summary alterations, equivalent has changed and modifications of the foregoing embodiments may be to be viewed as being within the scope of the technical solution of the present disclosure.

What is claimed is:

1. An Internet of Things (IoT) communication method performed by a wireless Access Point (AP) which is a communication end, the method comprising:
   receiving, via an instant messaging (IM) account of the wireless AP, access information and control information sent from an IM account of the wireless AP, access information and control information sent from an IM account of a user end, and communicating wirelessly through an Intelligent Grouping and Resource Sharing (IGRS) protocol with a plurality of source terminals without any intervention of additional equipment, wherein:
      the access information sent from the IM account of the user end includes an identifier of a source terminal and an access command which enables the wireless AP to directly access wirelessly through the IGRS protocol, status information of the source terminal,
      the control information sent from the IM account of the user end includes the identifier of the source terminal and a control command which enables the wireless AP to directly control wirelessly through the IGRS protocol, the source terminal, and
      the IM account of the wireless AP and the IM account of the user end are bound to each other in an instant messaging software, such that the IM account of the user end is the only account holder authorized to send the access command and the control command to the IM account of the wireless AP;
   sending directly and wirelessly through the IGRS protocol, the access command and the control command to the source terminal which is specified by the identifier of the source terminal;
   obtaining wirelessly, source information returned from the source terminal in response to receiving the access command and the control command from the wireless AP; and
   sending wirelessly, via the IM account of the wireless AP, the source information to the IM account of the user end.

2. The IoT communication method according to claim 1, wherein there are more than one IM accounts of the user end.

3. The IoT communication method according to claim 1, wherein the source terminal comprises an electric appliance enabled to perform wireless communication.

4. The IoT communication method according to claim 3, wherein the source terminal comprises a smart electric appliance.

5. The IoT communication method according to claim 1, further comprising: monitoring fault information sent by the source terminal, and sending the fault information to the account of the user end according to the IM account of the wireless AP.

6. An Internet of Things (IoT) communication method, comprising:
   sending by a user end, access information and control information via an instant messaging (IM) account of the user end to an IM account of a wireless Access Point (AP) which is a communication end, wherein the wireless AP communicates wirelessly through an Intelligent Grouping and Resource Sharing (IGRS) protocol with a plurality of source terminals without any intervention of additional equipment wherein:
      the access information sent from the IM account of the user end includes an identifier of the source terminal and an access command which enables the wireless AP to directly access wirelessly through the IGRS protocol, the status information of the source terminal,
      the control information sent from the IM account of the user end includes the identifier of the source terminal and a control command which enables the wireless AP to directly control wirelessly through the IGRS protocol, the source terminal, and
      the IM account of the user end and the IM account of the wireless AP are bound to each other in instant messaging software, such that the IM account of the user end is the only account holder authorized to send the access command and the control command to the IM account of the wireless AP; and
   receiving and displaying via the IM account of the user end, source information sent from the communication end, wherein the source information is returned to the communication end only in response to the source terminal directly receiving wirelessly the access command and the control command from the communication end through the IGRS protocol.

7. The IoT communication method according to claim 6, wherein:
   more than one IM accounts of the user end are bound to a single IM account of the wireless AP;
   a first of the more than one IM accounts of the user end is bound to the IM account of the wireless AP and the rest of the more than one IM accounts of the user end being slave accounts, and the slave accounts cannot be bound to the IM account of the user end unless authorized by the master account.

8. The IoT communication method according to claim 6, wherein more than one IM accounts of the wireless AP is bound to a single IM account of the user end, and the method further comprising displaying by categories, received plurality of source information according to the IM account of the wireless AP.

9. The IoT communication method according to claim 6, wherein the account of the user end establishes a communication link with the IM account of the wireless AP or with the source terminal, wherein the communication link is via one of or a combination of the following: 2-dimensional (2D) barcode scanning, text or numerical information input, Bluetooth, Near Field Communication (NFC), and WiFi.

10. The IoT communication method according to claim 6, wherein packaging container of the wireless AP or the wireless AP is installed with 2-dimensional (2D) barcode, wherein the 2-D barcode includes an encrypted account of the wireless AP and the account of the wireless AP is obtained by scanning and decrypting the 2-D barcode.

11. The IoT communication method according to claim 6, wherein prior to the receiving and displaying of the source information via the IM account of the user end, which source information is sent from the IM account of the wireless AP in response to the source terminal receiving the access command or the control command, comprising:
  obtaining the IM account of the wireless AP, and binding the IM account of the wireless AP to the IM account of the user end;
  displaying the IM account of the wireless AP or a name corresponding to the IM account of the wireless AP;
  receiving an adding command for adding the source terminal, obtaining the source information of the source terminal according to the adding command, and binding the source terminal to the IM account of the wireless AP; and
  displaying the source information of the source terminal or the name corresponding to the source terminal.

12. An Internet of Things (IoT) wireless access point (AP), which is a communication end, that comprises at least a processor with circuitry operating in conjunction with at least a memory which stores instruction codes operable as a plurality of modules, wherein the plurality of modules comprise:
  a receiving module, which is enabled to receive via an instant messaging (IM) account of the communication end, access information and control information sent from an IM account of a user end, wherein the wireless Access Point communicates wirelessly through an Intelligent Grouping and Resource Sharing (IGRS) protocol with a plurality of source terminals without any intervention of additional equipment, wherein:
  the access information sent from the IM account of the user end includes an identifier of a source terminal and an access command which enables the wireless AP to directly access wirelessly through the IGRS protocol, status information of the source terminal,
  the control information sent from the IM account of the user end includes the identifier of the source terminal and a control command which enables the wireless AP to directly access wirelessly through the IGRS protocol, status information of the source terminal, and
  the IM account of the wireless AP and the IM account of the user end are bound to each other in instant messaging software, such that the IM account of the user end is the only account holder authorized to send the access command and the control command to the IM account of the wireless AP;
  a sending module, which is enabled to send the access command and the control command to the source terminal which is specified by the identifier of the source terminal;
  an acquisition module, which is enabled to obtain source information from the source terminal which the source terminal returns in response to receiving the access command and the control command directly from the wireless AP through the IGRS protocol; and
  a forwarding module, which is enabled to directly send wirelessly through the IGRS protocol via the IM account of the wireless AP, the source information to the IM account of the user end.

13. The IoT wireless AP according to claim 12, wherein there are more than one IM accounts of the user end.

14. The IoT wireless AP according to claim 12, wherein the source terminal comprises an electric appliance enabled to perform wireless communication.

15. The IoT wireless AP according to claim 14, wherein the source terminal comprises a smart electric appliance.

16. The IoT wireless AP according to claim 12, further comprising a monitoring module which is enabled to monitor fault information sent by the source terminal, and sending the fault information to the IM account of the user end according to the IM account of the wireless AP.

17. An Internet of Things (IoT) user end that comprises at least a processor with circuitry operating in conjunction with at least a memory which stores instruction codes operable as a plurality of modules, wherein the plurality of modules comprise:
  a command sending module, which is enabled to send access information and control information via an instant messaging (IM) account of the user end to an IM account of a wireless Access Point (AP) which is a communication end, wherein the wireless Access Point communicates wirelessly through an Intelligent Grouping and Resource Sharing (IGRS) protocol with a plurality of source terminals without any intervention of additional equipment wherein:
  the access information sent from the IM account of the user end includes an identifier of the source terminal and an access command which enables the wireless AP to wirelessly directly access the status information of the source terminal through the IGRS protocol,
  the control information sent from the IM account of the user end includes the identifier of the source terminal and a control command which enables the wireless AP to wirelessly directly control the source terminal through the IGRS protocol, and
  the account of the user end and the IM account of the wireless AP are bound to each other in instant messaging software, such that the IM account of the user end is the only account holder authorized to send the access command and the control command to the IM account of the wireless AP; and
  a receiving and displaying module, which is enabled to receive and display, via the IM account of the user end, source information by the wireless AP, wherein the source information is returned to the wireless AP in response to the source terminal directly receiving the access command and the control command from the wireless AP wirelessly through the IGRS protocol.

18. The IoT user end according to claim 17, wherein:
  there are more than one IM accounts of the user end bound to a single IM account of the wireless AP;
  a first of the more than one IM accounts of the user end is bound to the IM account of the wireless AP and the rest of the more than one IM accounts of the user end being slave accounts, and the slave accounts cannot be bound to the IM account of the user end unless authorized by the master account.

19. The IoT user end according to claim 17, wherein more than one IM accounts of the wireless AP is bound to a single IM account of the user end, and the method further comprising displaying by categories, received plurality of source information according to the IM account of the wireless AP.

20. The IoT user end according to claim 17, wherein the IM account of the user end establishes a communication link with the IM account of the wireless AP or with the source terminal, wherein the communication link is via one of or a combination of the following: 2-dimensional (2D) barcode scanning, text or numerical information input, Bluetooth, Near Field Communication (NFC), and WiFi.

21. The IoT user end according to claim 17, wherein packaging container of the wireless AP or the wireless AP is installed with 2-dimensional (2D) barcode, wherein the 2-D barcode includes an encrypted account of the wireless AP, and the IM account of the wireless AP is obtained by scanning and decrypting the 2-D barcode.

22. The IoT user end according to claim 17, wherein prior to the receiving and displaying of the source information via the IM account of the user end, which source information is sent from the IM account of the wireless AP in response to the source terminal receiving the access command or the control command, comprising:
 obtaining the IM account of the wireless AP, and binding the IM account of the wireless AP to the IM account of the user end;
 displaying the IM account of the wireless AP or a name corresponding to the IM account of the wireless AP;
 receiving an adding command for adding the source terminal, obtaining the source information of the source terminal according to the adding command, and binding the source terminal to the IM account of the wireless AP; and
 displaying the source information of the source terminal or the name corresponding to the source terminal.

* * * * *